United States Patent Office 3,621,652
Patented Nov. 23, 1971

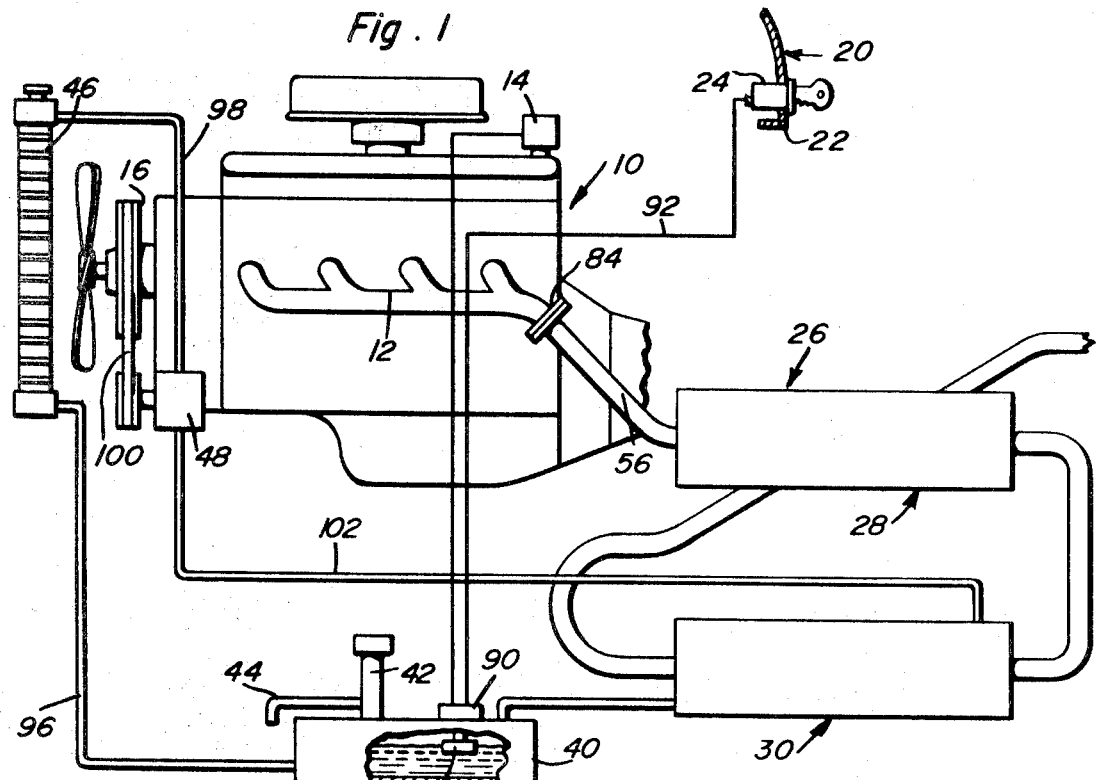
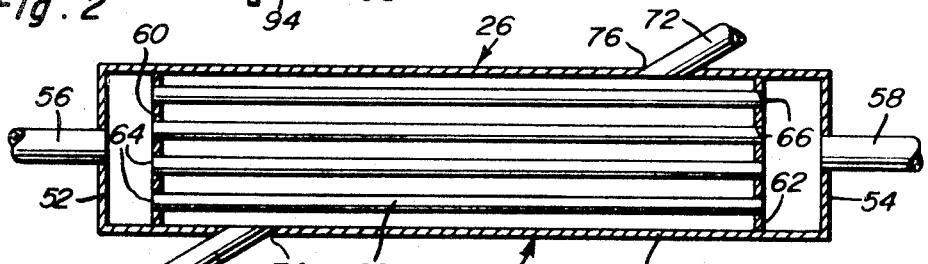
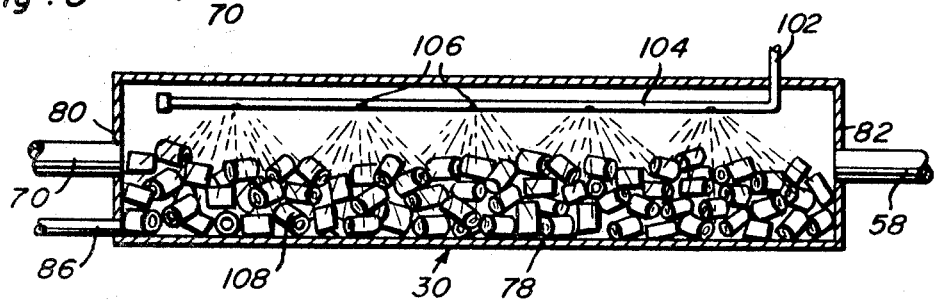

3,621,652
EXHAUST GAS WASHING APPARATUS
John S. DeMaree, P.O. Box 201,
Georgetown, Tex. 78626
Filed July 2, 1970, Ser. No. 51,908
Int. Cl. F01n 3/04; B01d 47/00
U.S. Cl. 60—30       3 Claims

ABSTRACT OF THE DISCLOSURE

An exhaust gas treatment apparatus including a heat exchanger defining first and second passages extending therethrough in good heat transfer relation and an exhaust gas scrubbing chamber including water jet discharge means for water spray cleansing and cooling of exhaust gases passing through the scrubbing chamber. The exhaust gases to be treated are first passed through the first passage of the heat exchanger, through the scrubbing chamber and thereafter through the second passage of the heat exchanger. The supply of water for the water jet discharge means comprises at least a semi-closed system wherein the sprayed water is collected, cooled and then pumped back through the water jet discharge means.

The exhaust gas treatment apparatus of the instant invention has been specifically designed to provide a means whereby air pollution supporting contaminants contained in combustion engine exhaust gases may be substantially fully cleansed therefrom. The apparatus functions to initially cool the exhaust gases being treated and to thereby enable some of the water vapors within the exhaust gas to be condensed out. However, as the water vapor begins to be condensed out of the exhaust gases being treated, the exhaust gases are ducted through a scrubbing chamber wherein the exhaust gases are subject to water sprays for washing the exhaust gases. These water sprays utilize water from a semi-closed water supply system including a heat exchanger for reducing the temperature of the water after it has been subjected to the heat of the exhaust gases being cleansed and the initial reduction in the temperature of the exhaust gases prior to their being ducted to the scrubbing chamber and the further reduction in the temperature of the exhaust gases in the scrubbing chamber results in considerable amounts of water being condensed out of the exhaust gases with the result that even though some of the water sprayed in the exhaust gas scrubbing chamber is suspended in the scrubbed exhaust gases being discharged from the scrubbing chamber, the supply of water for the water spray jets in the scrubbing chamber is never depleted. In fact, more water is added to the exhaust gas scrubbing supply of water by the condensation of water from the exhaust gases being treated than is lost from the scrubbing chamber by being suspended in the exhaust gases discharged from the scrubbing chamber.

In the form of the invention illustrated and described hereinafter in detail, the semi-closed water system utilizes the vehicle radiator as a heat exchanger and the water utilized by the exhaust gas treatment apparatus is also used as the engine coolant. However, the exhaust gas treatment apparatus may be readily provided with its own radiator for cooling the exhaust gas cooling and water spray water. Actually, in order to enable the associated internal combustion engine to be provided with a pressurized water cooling system, it would be desirable to have the radiator illustrated in the drawings comprising an additional radiator provided to serve as only the water of the exhaust gas treatment apparatus.

The main object of this invention is to provide an apparatus which will be capable of removing at least a major portion of contaminants in exhaust gases which tend to promote air pollution.

Another object of this invention is to provide an apparatus in accordance with the immediately preceding object and which utilizes a water spray system for washing the exhaust gases being treated.

Still another object of this invention is to provide an apparatus constructed in a manner whereby it will not be necessary to periodically add water to the supply system for the water spray nozzles of the apparatus.

A further object of this invention, in accordance with the immediately preceding object, is to provide an apparatus including means by which the exhaust gases being treated will be successively lowered in temperature by passing through two heat exchange devices, thereby enabling a considerable portion of the water vapor in the exhaust from an associated internal combustion engine to be condensed out of the exhaust gases, whereby spray droplets of water from the exhaust gas cleansing portion of the apparatus suspended in the exhaust gases being discharged from the apparatus will be more than replenished by the water vapor condensed out of the exhaust gases.

A still further object of this invention is to provide an exhaust gas treatment apparatus utilizing water spray jets for cleansing the exhaust gases to be treated thereby and provided with an overriding control whereby the associated internal combustion engine may not be started unless there is an ample supply of water in the supply system for the water jet utilized to scrub the exhaust gases.

A final object of this invention to be specifically enumerated herein is to provide an exhaust gas treatment apparatus in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a schematic view of the exhaust gas treatment apparatus operatively associated with an internal combustion engine and with a portion of the water reservoir of the apparatus broken away and illustrated in vertical section;

FIG. 2 is an enlarged fragmentary vertical sectional view of the exhaust gas heat exchanger portion of the apparatus; and FIG. 3 is an enlarged vertical sectional view of the exhaust gas scrubbing chamber portion of the exhaust gas treatment apparatus.

Referring now more specifically to the drawings the numeral 10 generally designates a conventional form of automotive internal combustion engine including an exhaust manifold 12, a distributor 14 and an engine driven fan pulley 16.

The engine 10 is mounted within a vehicle 20 including a dashboard portion 22 supporting an ignition switch 24 and the exhaust gas washing apparatus is referred to in general by the reference numeral 26.

The apparatus 26 includes a heat exchanger referred to in general by the reference numeral 28, an exhaust gas scrubbing chamber referred to in general by the reference numeral 30, a reservoir 40 including a capped filler tube 42 and an overflow tube 44, and a second heat exchanger 46 which is of the automotive radiator type. The apparatus 26 further includes a water pump 48.

With attention now invited more specifically to FIG. 2 of the drawings, the heat exchange chamber 28 defines an elongated tubular body 50 including end walls 52 and 54 through which inlet and outlet pipes 56 and 58 open. A pair of partition plates 60 and 62 are secured in the inlet and outlet ends of the body 50 and extend completely thereacross. The plates 60 and 62 include pairs of aligned apertures 64 and 66 in which the opposite ends of a plurality of heat exchange tubes 68 are secured. In addition, the body 50 includes an exhaust gas inlet pipe 70 and an exhaust gas outlet pipe 72. The outlet end of the inlet pipe 70 opens into the chamber defined between the plates 60 and 62 as at 74 and the inlet end of the outlet pipe 72 opens into the chamber defined between the plates 60 and 62 as at 76. It may therefore be seen that the heat exchanger chamber 28 defines an exhaust gas passage extending therethrough including the pipes 56 and 58, the tubes 68 and the opposite end chambers within the body 50 between the plates 60 and 62 and the end walls 52 and 54. In addition, the chamber 28 defines a second passage extending therethrough comprising the inlet pipe 70 and the outlet pipe 72 as well as the interior of the chamber disposed between the plates 60 and 62 exteriorly of the tubes 68.

The scrubbing chamber 30 comprises an elongated tubular body 78 provided with opposite end walls 80 and 82 and the discharge end of the outlet pipe 58 opens into the chamber 30 through the end wall 82. In addition, the inlet end of the inlet pipe 70 opens into the chamber 30 through the end wall 80 and it may be seen in FIG. 1 of the drawings that the inlet end of the inlet pipe 56 is coupled to the outlet end of the exhaust manifold as at 84 and that the exhaust gases from the exhaust manifold 12 will therefore pass through both passages extending through the heat exchange chamber 28. A drain line 86 extends from the outlet end of the chamber 30 to the upper portion of the closed reservoir 40 and the reservoir includes a float 88 for actuation of a switch 90 supported from the upper wall of the reservoir 40. The switch 90 is closed when the float is in a higher position and open when the float is lowered. Further, the switch 90 is serially connected in the conductor 92 extending between the ignition switch 24 and the distributor 14 whereby the electrical circuit of the distributor 14 will be opened in the event the float 88 drops below a predetermined lower level.

The reservoir 40 includes a drain cock 94 and a supply line 96 extends between the reservoir 40 and the lower portion of the radiator 46. A further line or conduit 98 extends between the radiator 46 and the inlet of the pump 48 which is driven from the fan pulley 16 through a flexible inlet belt 100. In addition, a pressure line 102 extends from the pump outlet to a manifold pipe section 104 disposed in and extending longitudinally of the chamber 30. The manifold pipe 104 has a plurality of longitudinally spaced outlet openings or jet orifices 106 formed therein and the interior of the chamber 30 is at least substantially filled with a plurality of ceramic sleeve bodies 108. The bodies 108 are porous and thus each offers considerable surface area as well as filter passages therethrough.

As hereinbefore set forth, the radiator 46 may comprise the conventional radiator for cooling the coolant water for the engine 10. However, it is desirable that the radiator 46 be used solely for the gas washing apparatus 26 and that the engine 10 be provided with its own radiator. Also, both the chambers 28 and 30 may be vertically disposed, if desired in the interest of more compactly mounting the apparatus 10 within an associated vehicle.

In operation, engine exhaust is discharged from the engine 10 to the exhaust manifold and then ducted through the tubes 68. During the passage of the hot exhaust gases through the heat exchange tubes 68, the temperature of the exhaust gases is appreciably lowered due to the lower temperature of the cleansed exhaust gases flowing through the second passage of the chamber 28 defined by the pipes 70 and 72 and the chamber defined between the plates 60 and 62 outside the tubes 68. As the exhaust gases are partially cooled during their passage through the chamber 28, water vapor within the exhaust gases begins to condense out. This condensing process occurs in the outlet pipe 58 leading to the scrubbing chamber 30 and water condensing out on the walls of the pipe 58 is blown therethrough into the chamber 30. Then, as the exhaust gases enter the chamber 30 they are subject to the spray jets of water being discharged from the manifold pipe 104. The jets of water wash the airborne particles from the exhaust gases and further reduce the temperature of the exhaust gases whereby more water is condensed therefrom.

Thereafter, the washed exhaust gases which have been appreciably cooled are then passed through the pipe 70 into the second passage of the chamber 28 whereby the cooled exhaust gases which have some droplets of water therein are utilized to cool the exhaust gases passing through the first passage of the chamber 28. Those droplets of water being carried by the cleansed exhaust gases into the second passage of the chamber 28 strike the outer surfaces of the heat exchange tubes 68 and are vaporized by the high heat of the exhaust gases passing through the tubes 68. Therefore, an even greater cooling effect on the exhaust gases passing through the heat exchange tubes 68 is afforded due to the fact that large quantities of heat energy is absorbed during the process of vaporizing the droplets of water on the external surfaces of the tubes 68.

The level of water within the reservoir 40 will rise appreciably if the engine 10 is operated for short intervals in cooler climates due to the fact that more condensation of water within the exhaust gases being treated will occur. In fact, continued intermittent operation of the engine 10 in cold climates will undoubtedly result in the reservoir 40 being completely filled with water and any further water condensed out of the exhaust gases which is in excess to those water droplets being carried by the exhaust gases outwardly of the chamber 28 will flow out the overflow tube 44.

However, if the engine 10 is operated for extended periods of time in extremely warm climates, it is possible that the slow buildup of heat within the entire apparatus 26 and the reduced efficiency of the radiator 46 will result in more water being carried out of the chamber 28 than is condensed out of the exhaust gases. In this instance, the water level within the reservoir 40 will be slowly lowered. When the water level reaches a predetermined minimum, the attendant lowering of the float 88 will cause the switch 90 to be opened and thus the circuit to the distributor 14 will be opened and terminate operation of the engine 10. If it is desired, a by-pass circuit provided with a manual switch may be utilized for by-passing the switch 90 in order that the engine 10 may continue to operate for short periods of time even though the water level within the reservoir 40 drops below the predetermined minimum. Further, the switch 90 may be of a double and reverse acting type and serially connected in a warning light circuit (not shown) for electrically actuating a dash mounted light as the water level is lowered to a level at least slightly above the level at which the ignition circuit will be opened.

The porous ceramic sleeves 108 greatly increase the wetted surface area contacted by the exhaust gases and thus the cooling and washing of the exhaust gases within the chamber 30 is quite efficient. Also various chemicals may be added to the water in the system to aid in the exhaust gas scrubbing action in the chamber 30.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An exhaust gas washing apparatus including a first heat exchanger defining first and second exhaust gas passages extending therethrough in good heat transfer relation, said passages each including inlet and outlet ends, an exhaust gas scrubbing chamber including inlet and outlet ends and water jet discharge means for water spray cleansing and cooling of the exhaust gases passing through said scrubbing chamber, means for ducting the exhaust gases discharged from the outlet end of said first passage to the inlet end of said scrubbing chamber, means for ducting the exhaust gases discharged from the outlet end of said scrubbing chamber to the inlet end of said second passage, a second air cooled heat exchanger, a water reservoir, water conveying means for conveying water from said reservoir to said second heat exchanger and from the latter to said water jet discharge means in said scrubbing chamber, means for collecting the water discharged from said water jet means and ducting the collected water back to said reservoir, a combustion engine provided with an exhaust manifold, means for ducting exhaust gases from said manifold to the inlet end of said first passage, said engine including an ignition circuit, a reservoir flow controlled switch serially connected in said circuit for opening the latter in response to the level of water in said reservoir dropping below a predetermined minimum, said means for conveying water including a pump driven from said engine operatively associated with said water conveying means between said reservoir and said water jet discharge means for pumping water from said reservoir to said water jet discharged means, and said scrubbing chamber including porous heat resistant bodies disposed therein each having a high surface area to volume ratio.

2. An exhaust gas washing apparatus including a first heat exchanger defining first and second exhaust gas passages extending therethrough in good heat transfer relation, said passages each including inlet and outlet ends, an exhaust gas scrubbing chamber including inlet and outlet ends and water jet discharge means for water spray cleansing and cooling of the exhaust gases passing through said scrubbing chamber, means for ducting the exhaust gases discharged from the outlet end of said first passage to the inlet end of said scrubbing chamber, means for ducting the exhaust gases discharged from the outlet end of said scrubbing chamber to the inlet end of said second passage, a second air cooled heat exchanger, a water reservoir, water conveying means for conveying water from said reservoir, to said second heat exchanger and from the latter to said water jet discharge means, means for collecting the water discharged from said water jet means and ducting the collected water back to said reservoir, a combustion engine provided with an exhaust manifold, means for ducting gases from said manifold to the inlet end of said first passage, said means for ducting the exhaust gases discharged from the outlet end of said scrubbing chamber to the inlet end of said second passage being free of water extraction means, whereby although the cooling of the exhaust gases passing through said scrubbing chamber will result in at least partial condensing of the water vapor portion of the exhaust gases within the scrubbing chamber certain quantities of remaining water vapor portions of the exhaust gases as well as water droplets from the water jet discharge means will be conveyed directly from the outlet end of the scrubbing chamber through the last mentioned exhaust gas ducting means into the inlet end of the second passage, thus, the water droplets in the form of condensation or spray droplets ducted from the interior of the scrubbing chamber may impinge upon the internal surfaces of the second passage extending through the first heat exchanger and be vaporized by the high heat of the exhaust gases during their initial pass through the first heat exchanger resulting in greater heat absorbtion from the exhaust gases during their initial movement through the first heat exchanger.

3. The combination of claim 2 wherein said scrubbing chamber includes porous heat resistant bodies disposed therein each having a high surface area to volume ratio.

References Cited

UNITED STATES PATENTS

| | | | |
|---|---|---|---|
| 940,596 | 11/1909 | Herreshoff | 55—228 X |
| 1,871,815 | 8/1932 | Meston et al. | 55—135 X |
| 2,108,248 | 2/1938 | Bichowsky | 55—228 X |
| 2,538,450 | 1/1951 | Gardner | 55—222 X |
| 2,686,399 | 8/1954 | Stolz | 60—30 L |
| 2,687,008 | 8/1954 | Van Vactor | 123—198 X |
| 2,709,335 | 5/1955 | Van Vactor | 123—198 X |
| 2,789,032 | 4/1957 | Bagley et al. | 23—2(.2) |
| 3,032,968 | 5/1962 | Novak et al. | 60—31 X |
| 3,100,376 | 8/1963 | Potter | 60—30 L |
| 3,201,338 | 8/1965 | Pennington | 204—193 |
| 3,282,047 | 11/1966 | Wertheimer | 60—30 L |
| 3,307,335 | 3/1967 | Shomaker | 55—267 |
| 3,316,693 | 5/1967 | Fermor | 55—256 X |
| 3,353,336 | 11/1967 | Caballero | 55—228 |
| 3,383,854 | 5/1968 | White | 60—29 |
| 3,487,607 | 1/1970 | Cox | 55—228 X |

DENNIS E. TALBERT, JR., Primary Examiner

U.S. Cl. X.R.

23—2 R; 55—222, 223, 227, 228, 229, 233, 268, 274, 385, Dig. 20, Dig. 30, Dig. 34; 60—31; 123—198 D.C.; 261—34 R, 94, 118, 128, 151, 157